US008455062B2

(12) United States Patent
Nakai et al.

(10) Patent No.: US 8,455,062 B2
(45) Date of Patent: *Jun. 4, 2013

(54) LIQUID CRYSTAL DISPLAY PANEL AND PROCESS FOR PRODUCTION THEREOF

(75) Inventors: Takako Nakai, Osaka (JP); Masanobu Mizusaki, Osaka (JP); Youhei Nakanishi, Osaka (JP)

(73) Assignee: Sharp Kabushiki Kaisha, Osaka (JP)

(*) Notice: Subject to any disclaimer, the term of this patent is extended or adjusted under 35 U.S.C. 154(b) by 0 days.

This patent is subject to a terminal disclaimer.

(21) Appl. No.: 13/382,210

(22) PCT Filed: Mar. 24, 2010

(86) PCT No.: PCT/JP2010/002091

§ 371 (c)(1),
(2), (4) Date: Jan. 4, 2012

(87) PCT Pub. No.: WO2011/004519

PCT Pub. Date: Jan. 13, 2011

(65) Prior Publication Data

US 2012/0113370 A1    May 10, 2012

(30) Foreign Application Priority Data

Jul. 8, 2009 (JP) .................. 2009-162121

(51) Int. Cl.
*G02F 1/1337* (2006.01)
*C09K 19/38* (2006.01)
*C09K 19/32* (2006.01)
*C09K 19/12* (2006.01)

(52) U.S. Cl.
USPC ......... 428/1.2; 428/1.23; 428/1.25; 428/1.26; 428/1.27; 252/299.62; 252/299.66; 349/123; 349/127; 349/183

(58) Field of Classification Search
USPC .............. 428/1.1, 1.2, 1.23, 1.25, 1.26, 1.27; 252/299.01, 299.66, 299.67, 299.5, 299.62; 349/123, 127, 183
See application file for complete search history.

(56) References Cited

U.S. PATENT DOCUMENTS

| 5,894,050 A | 4/1999 | Camps et al. |
| 5,959,707 A | 9/1999 | Murai et al. |

(Continued)

FOREIGN PATENT DOCUMENTS

| JP | 9-197407 | 7/1997 |
| JP | 11-508064 | 7/1999 |

(Continued)

OTHER PUBLICATIONS

International Search Report for PCT/JP2010/002091 mailed Jun. 29, 2010.

(Continued)

*Primary Examiner* — Shean C Wu
(74) *Attorney, Agent, or Firm* — Nixon & Vanderhye P.C.

(57) ABSTRACT

To provide a liquid crystal display panel that has high contrast and reduced display deficiency, a liquid crystal display panel of the present invention includes: a pair of substrates (1) and (2) facing each other; and a liquid crystal layer (3) sandwiched between the pair of substrates (1) and (2), the pair of substrates (1) and (2) being provided with a pair of respective alignment films (4) and (5) formed thereon and facing each other, the pair of alignment films (4) and (5) being provided with respective polymer films (6) and (7) formed thereon and each made of a monomer in the liquid crystal layer (3), the pair of alignment films (4) and (5) containing a macromolecular compound having a side chain containing a fluorine atom, the liquid crystal layer (3) containing a polymerizable monomer represented by at least one of General Formulae (1) through (3), the polymer films (6) and (7) each being made of the polymerizable monomer represented by at least one of General Formulae (1) through (3), the polymer films (6) and (7) and the side chain containing the fluorine atom attracting each other through interaction.

8 Claims, 7 Drawing Sheets

U.S. PATENT DOCUMENTS

| | | | |
|---|---|---|---|
| 2004/0262402 A1 | 12/2004 | Wilderbeek et al. | |
| 2005/0116200 A1 | 6/2005 | Nakanishi et al. | |
| 2006/0279502 A1 | 12/2006 | Chang | |
| 2007/0103607 A1 | 5/2007 | Hanaoka et al. | |
| 2007/0170394 A1* | 7/2007 | Kawamura et al. | 252/299.01 |
| 2009/0086139 A1 | 4/2009 | Pai et al. | |
| 2009/0207357 A1 | 8/2009 | Tashiro et al. | |
| 2012/0099064 A1 | 4/2012 | Nakai et al. | |

FOREIGN PATENT DOCUMENTS

| | | |
|---|---|---|
| JP | 2003-307720 | 10/2003 |
| JP | 2005-509187 | 4/2005 |
| JP | 2006-343719 | 12/2006 |
| JP | 2009-86296 | 4/2009 |
| WO | 2011/004519 A1 | 1/2011 |
| WO | WO 2011/004518 | 1/2011 |

OTHER PUBLICATIONS

Written Opinion of the International Searching Authority mailed Jun. 29, 2010.

International Search Report for PCT/JP2010/002090, mailed Jun. 29, 2010.

* cited by examiner

LIQUID CRYSTAL DISPLAY PANEL AND PROCESS FOR PRODUCTION THEREOF

This application is the U.S. national phase of International Application No. PCT/JP2010/002091 filed 24 Mar. 2010 which designated the U.S. and claims priority to JP 2009-162121 filed 8 Jul. 2009, the entire contents of each of which are hereby incorporated by reference.

TECHNICAL FIELD

The present invention relates to a liquid crystal display panel and a method for producing the liquid crystal display panel. In particular, the present invention relates to (i) a liquid crystal display panel having high contrast and reduced display deficiency and (ii) a method for producing the liquid crystal display panel.

BACKGROUND ART

Recent years have witnessed an increasing demand for a high-performance, low-cost liquid crystal display panel together with widespread use of information equipment.

A high-performance liquid crystal display panel is produced with use of, for example, a known technique called polymer sustained alignment (PSA).

PSA is a technique that adds, as an alignment film material, a monomer to a liquid crystal material for display use and that polymerizes the monomer to form, on a first alignment film, a layer [polymer layer (polymer film)] as a second alignment layer. Specifically, a pair of substrates each including a first alignment film are combined with each other in such a manner that the respective first alignment films face each other and a cell is formed between the substrates. Then, a liquid crystal material including a monomer is injected into the cell, and the liquid crystal molecules are aligned in a predetermined direction through, for example, application of an electric field. In this state, the monomer is polymerized by, for example, ultraviolet irradiation. This polymerization forms, on each of the first alignment films, a polymer layer that provides a tilt to liquid crystal molecules at the interface. This operation causes liquid crystal molecules in contact with the polymer layer to be fixed at a pre-tilt angle.

Patent Literature 1, for example, discloses a liquid crystal display device that is produced by (i) injecting a liquid crystal composition containing a polymerizable monomer between two substrates and (ii) polymerizing the monomer while applying a voltage across a transparent electrode sandwiched by the substrates facing each other. The polymerizable monomer includes (i) at least one ring structure or condensed structure and (ii) two functional groups directly bonded to the at least one ring structure or condensed structure. This liquid crystal display device thus has reduced screen burn-in.

CITATION LIST

Patent Literature 1
Japanese Patent Application Publication, Tokukai, No. 2003-307720 A (Publication Date: Oct. 31, 2003)

SUMMARY OF INVENTION

Technical Problem

The liquid crystal display device disclosed in Patent Literature 1 is, however, problematic in that, for example, (i) if a huge polymer domain has been formed during the polymerization in a liquid crystal material, there occurs Rayleigh scattering, which decreases contrast, and in that (ii) generation of a huge polymer causes display deficiency (for example, a bright dot and/or a black dot).

The present invention has been accomplished in view of the above problem with conventional art. It is an object of the present invention to provide (i) a liquid crystal display panel that has high contrast and reduced display deficiency and (ii) a method for producing the liquid crystal display panel.

Solution to Problem

The inventor of the present invention has uniquely found as a result of diligent examination of the above problem that combining (i) an alignment film used in PSA with (ii) a monomer added to a liquid crystal material permits production of a liquid crystal display panel including a uniform polymer film. The inventor has thus completed the present invention.

In order to solve the above problem, a liquid crystal display panel of the present invention includes: a pair of substrates facing each other; and a liquid crystal material sandwiched between the pair of substrates, the pair of substrates being provided with a pair of respective alignment films formed thereon and facing each other, the pair of alignment films being provided with respective polymer films formed thereon and each made of a monomer in the liquid crystal material, the pair of alignment films each containing a macromolecular compound having a side chain containing a fluorine atom, the liquid crystal material containing a polymerizable monomer represented by at least one of General Formulae (1) through (3), the polymer films each being made of the polymerizable monomer represented by at least one of General Formulae (1) through (3), the polymer films and the side chain containing the fluorine atom attracting each other through interaction (weak attractive force). The macromolecular compound is preferably a polyimide, a polyamide, a polyvinyl, a polysiloxane, a polymaleimide, or a derivative thereof. In General Formulae (1) and (3), a substituent group for the benzene ring is present at the o-position, m-position, or p-position. In General Formula (2), a substituent group for the naphthalene ring is present at the o-position, m-position, p-position, ana-position, ∈ (epi)-position, kata-position, peri-position, pros-position, amphi-position, or 2,7-position. The substituent group for the benzene ring is preferably present at the p-position among the above positions. The substituent group for the naphthalene ring is preferably present at the amphi-position among the above positions.

Chem. 1

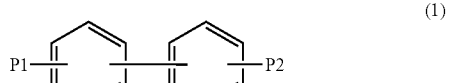

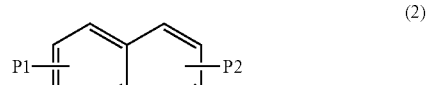

In the above Formulae, P1 and P2 are each independently an acrylate group, a methacrylate group, a vinyl group, or a vinyloxy group.

The following describes in detail a mechanism by which to form the polymer films included in the liquid crystal display panel of the present invention: The polymerizable monomer and the side chain containing a fluorine atom attract each other through interaction (weak attractive force). The monomer is thus likely to be present in the vicinity of the alignment films, thus increasing the concentration of the monomer in the vicinity of the alignment films. As a result, irradiating the polymerizable monomer with light or heat easily forms polymer films in the vicinity of the alignment films. Further, the polymer films thus formed and the side chain containing a fluorine atom attract each other through interaction (weak attractive force). The mechanism by which to form the polymer films included in the liquid crystal display panel of the present invention can also be described as follows: First, the monomer and the fluorine atom attract each other. This attraction then increases the concentration of the monomer along the interface of the alignment films, and consequently promotes polymerization of the monomer. It is by this mechanism that the polymer films of the present application are formed, the polymer films and the side chain containing a fluorine atom attracting each other through interaction (weak attractive force).

The above arrangement provides attraction between (i) the fluorine atom and (ii) the aryl group (that is, a phenyl group, a naphthyl group, a biphenyl, or naphthalene) in the polymerizable monomer represented by at least one of General Formulae (1) through (3) above. This breaks a n bond of the vinyl group in the polymerizable monomer, so that a radical is generated. The polymerizable monomer represented by at least one of General Formulae (1) through (3) above has a double bond between carbon atoms. The double bond thus undergoes a dissociation reaction with the radical. This arrangement allows the polymer films to be formed.

Further, according to the above arrangement, the side chain containing a fluorine atom is uniformly dispersed over the alignment films. Since the side chain containing a fluorine atom and the polymer films attract each other through interaction (weak attractive force), the polymer films are also uniform films.

The side chain containing a fluorine atom is uniformly dispersed in the alignment films for the following reason: Fluorine atoms are present in units (each made up of one or more) that are in one-to-one correspondence with units of the alignment film compound. Further, fluorine atoms, which are in the side chain, are present mostly at the interface with air. This indicates that the fluorine atoms are uniformly present both in a plane direction and in a thickness direction. This in turn indicates that the side chain containing a fluorine atom is uniformly dispersed in the alignment films.

The polymerizable monomer represented by at least one of General Formulae (1) through (3) above has a benzene ring. The polymerizable monomer can thus support the tilt rigidly as compared to a monomer having an alkyl chain instead of a benzene ring (which means that the tilt is not easily changed by a voltage applied for an extended period of time).

As described above, the liquid crystal display panel of the present invention, in which the polymer films are formed uniformly, causes no Rayleigh scattering, and consequently achieves high contrast. Further, the liquid crystal display panel of the present invention, in which the polymer films are formed uniformly, prevents generation of a huge polymer floating in a liquid crystal bulk, and consequently prevents display deficiency (for example, a bright dot and/or a black dot).

Advantageous Effects of Invention

As described above, the liquid crystal display panel of the present invention includes: a pair of substrates facing each other; and a liquid crystal material sandwiched between the pair of substrates, the pair of substrates being provided with a pair of respective alignment films formed thereon and facing each other, the pair of alignment films being provided with respective polymer films formed thereon and each made of a monomer in the liquid crystal material, the pair of alignment films each containing a macromolecular compound having a side chain containing a fluorine atom, the liquid crystal material containing a polymerizable monomer represented by at least one of General Formulae (1) through (3), the polymer films each being made of the polymerizable monomer represented by at least one of General Formulae (1) through (3), the polymer films and the side chain containing the fluorine atom attracting each other through interaction (weak attractive force).

The liquid crystal display panel of the present invention thus attains the object of providing a liquid crystal display panel that has high contrast and reduced display deficiency.

DESCRIPTION OF EMBODIMENTS

An embodiment of the present invention is described below. The present invention is, however, not limited to this embodiment. Dimensions, materials, shapes, relative arrangements and the like of constituent members described in the present embodiment are, unless otherwise specified, not intended to limit the scope of the present invention, and are therefore merely illustrative examples. In the present specification and the like, the range of "A to B" intends to mean not less than A and not more than B.

Figure 1:
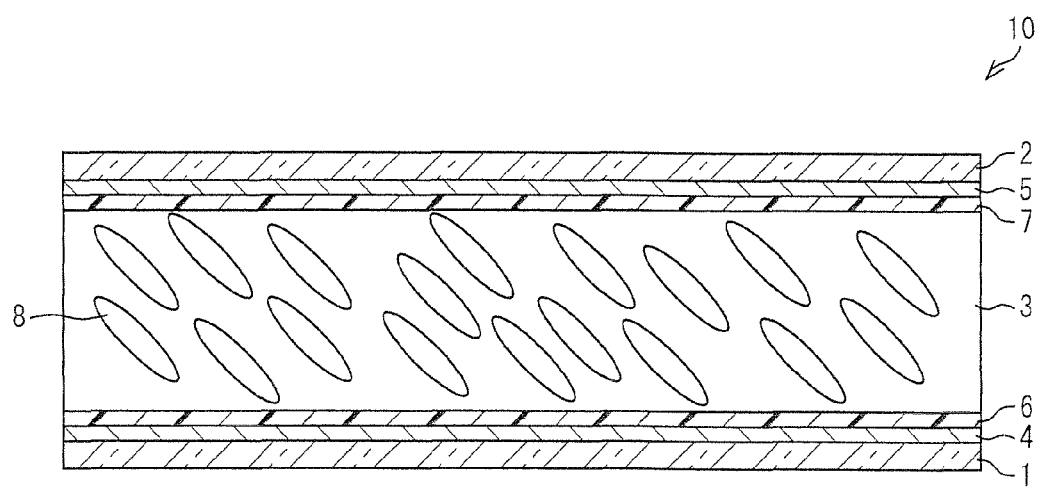
FIG. 1 is a cross-sectional view illustrating a liquid crystal display panel in accordance with an embodiment of the present invention.

FIG. 1 is a cross-sectional view schematically illustrating a configuration of a liquid crystal display panel 10 of the present embodiment. Specifically, the liquid crystal display panel 10 mainly includes: a pair of substrates 1 and 2 facing each other; and a liquid crystal layer (liquid crystal material) 3 sandwiched between the pair of substrates 1 and 2. The liquid crystal layer 3 is contained therebetween with use of a sealing agent (not shown). The substrates 1 and 2 are provided with respective alignment films 4 and 5 facing each other. The liquid crystal layer 3 contains liquid crystal molecules 8. The alignment films 4 and 5 are provided with respective polymer films 6 and 7 formed thereon.

The alignment films 4 and 5 each contain a macromolecular compound including a side chain containing a fluorine atom. The macromolecular compound is preferably a polyimide, a polyamide, a polyvinyl, a polysiloxane, a polymaleimide, or a derivative of any of the above.

The liquid crystal layer 3 contains a polymerizable monomer represented by at least one of General Formulae (1) through (3) above.

The polymer films 6 and 7 are each made of the polymerizable monomer represented by at least one of General Formulae (1) through (3), and the polymer films 6 and 7 and the side chain containing a fluorine atom attract each other through interaction (weak attractive force).

<Substrate>

The pair of substrates 1 and 2 facing each other are specifically a first substrate 1 and a second substrate 2 (that is, an array substrate and a counter substrate).

The array substrate is, for example, an active matrix substrate such as a TFT (thin film transistor) substrate including a plurality of active elements such as TFTs. The counter substrate is, for example, a CF (color filter) substrate.

The active matrix substrate is configured, for example, as follows: Pixel electrodes each made of ITO (indium tin oxide) and active elements such as TFTs (thin film transistors) are both provided on a glass substrate in a one-to-one correspondence with pixels. A vertical alignment film (alignment film) and a polymer layer (polymer film) are formed, in that order from the glass substrate side, over the pixel electrodes and the active elements so as to cover them.

The CF substrate is configured, for example, as follows: A color filter layer including color filters of R, G, and B in correspondence with the individual pixels is provided on a glass substrate. A BM (black matrix) is formed between the individual color filters. A common electrode made of ITO (indium tin oxide), a vertical alignment film (alignment film), and a polymer layer (polymer film) are formed, in that order from the glass substrate side, so as to cover the color filters and the BM.

The substrates 1 and 2 may further be provided with respective polarizing plates each on a surface opposite to a surface on which either of the alignment films 4 and 5 is formed.

<Liquid Crystal Layer (Liquid Crystal Material)>

The liquid crystal layer 3 contains the polymerizable monomer represented by at least one of General Formulae (1) through (3).

Chem. 2

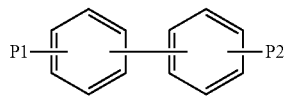

(1)

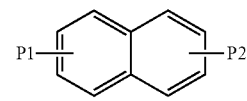

(2)

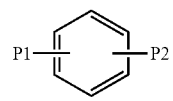

(3)

In the above Formulae, P1 and P2 are each independently an acrylate group, a methacrylate group, a vinyl group, or a vinyloxy group.

The liquid crystal layer 3 is not particularly limited, provided that it contains the polymerizable monomer represented by at least one of General Formulae (1) through (3) above. The liquid crystal layer 3 can thus be made of any of various liquid crystal materials that have been known publicly. The liquid crystal layer 3 may be made of a liquid crystal material identical to or different from that for display use.

In the case where the above monomer is dissolved or dispersed in a liquid for use as a monomer composition, the monomer is not particularly limited in terms of concentration. The concentration may be set as appropriate in accordance with, for example, (i) respective kinds of the monomer and the liquid and (ii) a method for supplying the monomer composition onto the substrates. The monomer is preferably high in concentration because a higher concentration allows for a shorter tact. If, however, the monomer remains (as a residual monomer) without being polymerized into a film, a negative consequence results such as screen burn-in of the liquid crystal display panel. Further, if the monomer is too high in concentration, it may not be fully dissolved and may consequently be separated. Thus, it is presumed that the monomer in the monomer composition particularly preferably has a concentration of 1 wt % or less.

The monomer in the monomer composition preferably has a concentration of (i) 0.1 wt % or greater for a shorter tact and (ii) 10 wt % or less for compatibility.

The monomer or the monomer composition may be supplied onto the alignment films 4 and 5 by any method, so the method is not particularly limited. The monomer or the monomer composition may, for example, be applied onto the alignment films 4 and 5.

The monomer may be supplied (applied) onto the alignment films 4 and 5 in any amount, so the amount is not particularly limited. The amount may be set as appropriate in accordance with, for example, respective thicknesses of the polymer films 6 and 7 formed by polymerization of the monomer.

<Alignment Film>

The alignment films 4 and 5 each contain a macromolecular compound including, as a side chain, the photo-crosslinking group represented by Structural Formula (A).

Chem. 3

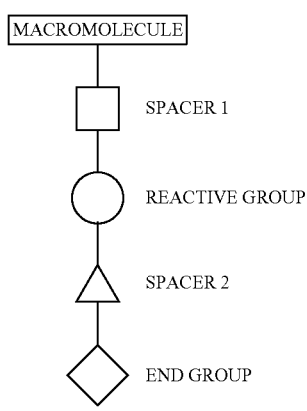

(A)

In the above Formula, [A] the spacer 1 is a group selected from the group consisting of —$(CH_2)_r$—, —O—$(CH_2)_r$—, —CO—O—$(CH_2)_r$—, —O—CO—$(CH_2)_r$—, —NR1-CO—$(CH_2)_r$—, —CO—NR1-$(CH_2)_r$—, —NR1-$(CH_2)_r$—, —$(CH_2)_r$—O—$(CH_2)_s$—, —$(CH_2)_r$—CO—O—$(CH_2)_s$—, —$(CH_2)_r$—O—CO—$(CH_2)_s$—, —$(CH_2)_r$—NR1-CO—$(CH_2)_s$—, —$(CH_2)_r$—NR1-CO—O—$(CH_2)_s$—, —O—$(CH_2)_r$—O—$(CH_2)_s$—, —O—$(CH_2)_r$—CO—O—$(CH_2)_s$—, —O—$(CH_2)_r$—NR1-CO—$(CH_2)_s$—, —O—$(CH_2)_r$—NR1-CO—O—$(CH_2)_s$—, and —CO—O—$(CH_2)_r$—O—$(CH_2)_s$—, where R1 is a hydrogen atom or a lower alkyl, and r and s are each an integer of 1 to 20; [B] the reactive group is a group selected from General Formulae (4) through (8);

Chem. 4

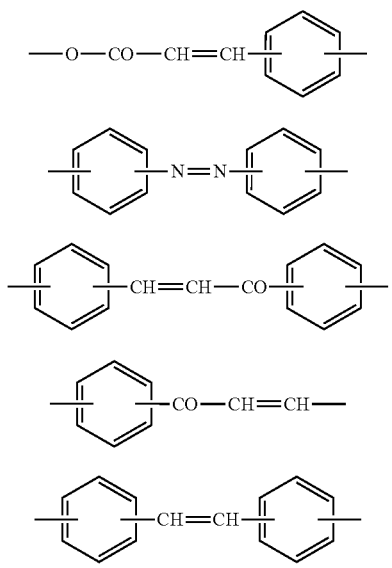

[C] the spacer 2 includes (i) S1 closer to the reactive group and (ii) S2 closer to the end group, the S1 being a group selected from the group consisting of —O—, —CO—O—, —O—CO—, —NR1-, —NR1-CO—, —CO—NR1-, —NR1-CO—O—, —O—CO—NR1-, —NR1-CO—NR1-, CH=CH—, —C≡C—, —O—CO—O—, and a linear or branched-chain alkylene group, where two or three unadjacent $CH_2$ groups of the alkylene may each be independently substituted by a group Q, and R1 is a hydrogen atom or a lower alkyl (the alkylene group containing chained carbon atoms in a total number of not greater than 24), the S2 being an aromatic or alicyclic group either unsubstituted or substituted by fluorine, chlorine, a cyano, or a cyclic, linear, or branched-chain alkyl residue (which is unsubstituted, single-substituted by a cyano or a halogen, or multisubstituted by a halogen, which has 1 to 18 carbons atoms, and in which at least one unadjacent $CH_2$ group may be independently substituted by the group Q), the group Q being a group selected from the group consisting of —O—, —CO—, —CO—O—, —O—CO—, —Si$(CH_3)_2$—O—Si$(CH_3)_2$—, —NR1-, —NR1-CO—, —CO—NR1-, —NR1-CO—O—, —O—CO—NR1-, —NR1-CO—NR1-, —CH=CH—, —C≡C—, and —O—CO—O—, where R1 is a hydrogen atom or a lower alkyl; and [D] the end group is a linear or branched-chain alkyl residue (in which at least one unadjacent $CH_2$ group may be independently substituted by the group Q) that (i) is either single-substituted by fluorine or multisubstituted by fluorine and that (ii) has 3 to 18 carbon atoms.

<Polymer Film>

The liquid crystal display panel 10 is configured such that the alignment films 4 and 5 are provided, formed thereon, with the respective polymer films 6 and 7 that are each made of the polymerizable monomer represented by at least one of General Formulae (1) through (3) and (ii) the polymer films 6 and 7 and the side chain containing a fluorine atom attract each other through interaction (weak attractive force). The polymer films 6 and 7 are formed by a mechanism that is described in detail in Examples below.

The polymer films 6 and 7 may each include any other substance, provided that (i) they are each made of the polymerizable monomer represented by at least one of General Formulae (1) through (3), and (ii) the polymer films 6 and 7 and the side chain containing a fluorine atom attract each other through interaction (weak attractive force).

<Method for Producing Liquid Crystal Display Panel>

The liquid crystal display panel 10 is produced by irradiating the alignment films 4 and 5 and the liquid crystal layer 3 with light or heat.

The irradiation light is not particularly limited in terms of illuminance, provided that the illuminance falls within a range of illuminance commonly adopted in PSA. The illuminance, however, preferably falls within the range of 100 to 10,000 J/cm$^2$ in order to, for example, shorten a tact, reduce device costs, and increase reliability.

The irradiation heat is not particularly limited in terms of temperature, provided that the temperature falls within a range of temperature commonly adopted in PSA. The temperature, however, preferably falls within the range of 0 to 80° C. (that is, in the vicinity of a phase transition temperature for the liquid crystal).

The method for producing the liquid crystal display panel 10 preferably involves a pretreatment of irradiating the alignment films 4 and 5 with light or heat before irradiating the alignment films 4 and 5 and the liquid crystal layer 3 with light or heat.

The liquid crystal display panel 10 may alternatively be produced by irradiating the alignment films 4 and 5 and the liquid crystal layer 3 with light or heat while a voltage is applied between respective electrodes fixed to the substrates 1 and 2. This alternative is similar to the above in terms of illuminance of irradiation light and temperature of irradiation heat.

The voltage applied as above is not particularly limited, provided that it falls within a range of voltage commonly adopted in PSA. The voltage, however, preferably falls within the range of 5 to 90 V in consideration of (i) a threshold voltage at which the liquid crystal molecules start to move (or slant) and (ii) a dielectric strength voltage for the liquid crystal.

The method for producing the liquid crystal display panel 10 may use the above polymerizable monomer solely or use it as dissolved or dispersed in a liquid.

In the case where the monomer is dissolved or dispersed in a liquid, particularly a liquid that is lower in viscosity than the monomer and that is higher in fluidity than the monomer, the monomer is easily polymerized in an alignment direction of the alignment films 4 and 5, and it is thus easy to control the alignment.

The method for producing the liquid crystal display panel 10 may involve adding a polymerization initiator, such as methyl ethyl ketone peroxide and a benzoyl ether-based compound, which serves to accelerate polymerization of the polymerizable monomer with the alignment films 4 and 5.

Other polymerization conditions such as a duration are not particularly limited. Such other conditions may be set as appropriate so that the polymer films 6 and 7 to be prepared will have a desired thickness and shape.

<Preferable Modes of Present Invention>

The liquid crystal display panel of the present invention may preferably be arranged such that the macromolecular compound further includes a functional group represented by at least one of General Formulae (4) through (8). In General Formulae (4) through (8), a substituent group for the benzene ring is present at the o-position, the m-position, or the p-position. The substituent group for the benzene ring is preferably present at the p-position among the above positions.

Chem. 5

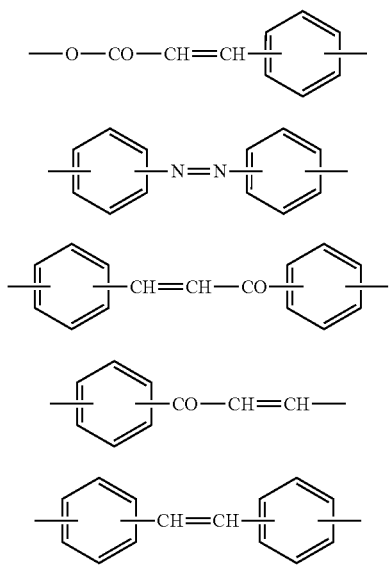

According to the above arrangement, the polymerizable monomer represented by at least one of General Formulae (1) through (3) above has a double bond between carbon atoms. The double bond undergoes a dissociation reaction with a radical generated from the functional group represented by at least one of General Formulae (4) through (8) above. This arrangement allows the polymer films to be formed effectively.

The liquid crystal display panel of the present invention may preferably be arranged such that the polymerizable monomer is a compound represented by General Formula (9) or (10). In General Formula (9), a substituent group for the benzene ring is present at the o-position, m-position, or p-position. In General Formula (10), a substituent group for the naphthalene ring is present at the o-position, m-position, p-position, ana-position, ∈ (epi)-position, kata-position, peri-position, pros-position, amphi-position, or 2,7-position. The substituent group for the benzene ring is preferably present at the p-position among the above positions. The substituent group for the naphthalene ring is preferably present at the amphi-position among the above positions.

Chem. 6

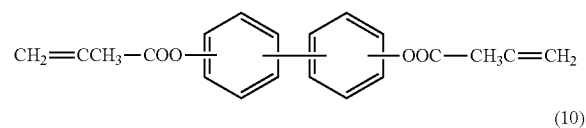

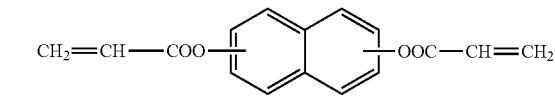

The liquid crystal display panel of the present invention, if containing a normal acrylate or methacrylate as the monomer, will pose a problem with its reliability (that is, cause screen burn-in, for example). The liquid crystal display panel, however, has improved reliability in the case where (i) the monomer is bifunctional or (ii) a rigid substance (for example, benzene) is present between individual monomers.

A method of the present invention for producing a liquid crystal display panel is a method for producing the above liquid crystal display panel, the method including the step of: irradiating the pair of alignment films and the liquid crystal material with light or heat.

The above arrangement irradiates, with light or heat, (i) the macromolecular compound contained in the alignment films and including the side chain containing a fluorine atom and (ii) the polymerizable monomer contained in the liquid crystal material and represented by at least one of General Formulae (1) through (3). This makes it possible to form, on each of the alignment films, a polymer film that is made of the polymerizable monomer, the polymer film and the side chain containing a fluorine atom attracting each other through interaction (weak attractive force).

The method of the present invention for producing the liquid crystal display panel may preferably be arranged such that the method includes the successive steps of: carrying out a pretreatment of irradiating the pair of alignment films with light or heat; and irradiating the pair of alignment films and the liquid crystal material with light or heat.

With the above arrangement, the method of the present invention for producing a liquid crystal display panel allows the polymer films each made of the polymerizable monomer to have an effective alignment.

A method of the present invention for producing a liquid crystal display panel is a method for producing the above liquid crystal display panel, the method including the step of:

irradiating the pair of alignment films and the liquid crystal material with light or heat while applying a voltage between respective electrodes fixed to the pair of substrates.

The above arrangement, while applying a voltage between the respective electrodes fixed to the pair of substrates, irradiates, with light or heat, (i) the macromolecular compound contained in the alignment films and including the side chain containing a fluorine atom and (ii) the polymerizable monomer contained in the liquid crystal material and represented by at least one of General Formulae (1) through (3). This makes it possible to form, on each of the alignment films, a polymer film that is made of the polymerizable monomer, the polymer film and the side chain containing a fluorine atom attracting each other through interaction (weak attractive force). The polymer film has a more effective alignment.

The method of the present invention for producing the liquid crystal display panel may preferably be arranged such that the polymerizable monomer is dissolved in the liquid crystal material.

With the above arrangement, the method of the present invention for producing a liquid crystal display panel allows the monomer to be polymerized in an alignment direction of the alignment films, and thus facilitates alignment control.

The present invention is not limited to the description of the embodiment above, but may be altered in various ways by a skilled person within the scope of the claims. Any embodiment based on a combination of technical means appropriately altered within the scope of the claims is also encompassed in the technical scope of the present invention.

EXAMPLES

With reference to Examples, the following describes in further detail the liquid crystal display panel of the present embodiment and the method for producing the liquid crystal display panel. The liquid crystal display panel of the present embodiment and the method for producing the liquid crystal display panel are, however, not limited to only Examples below.

Example 1

Figure 2:
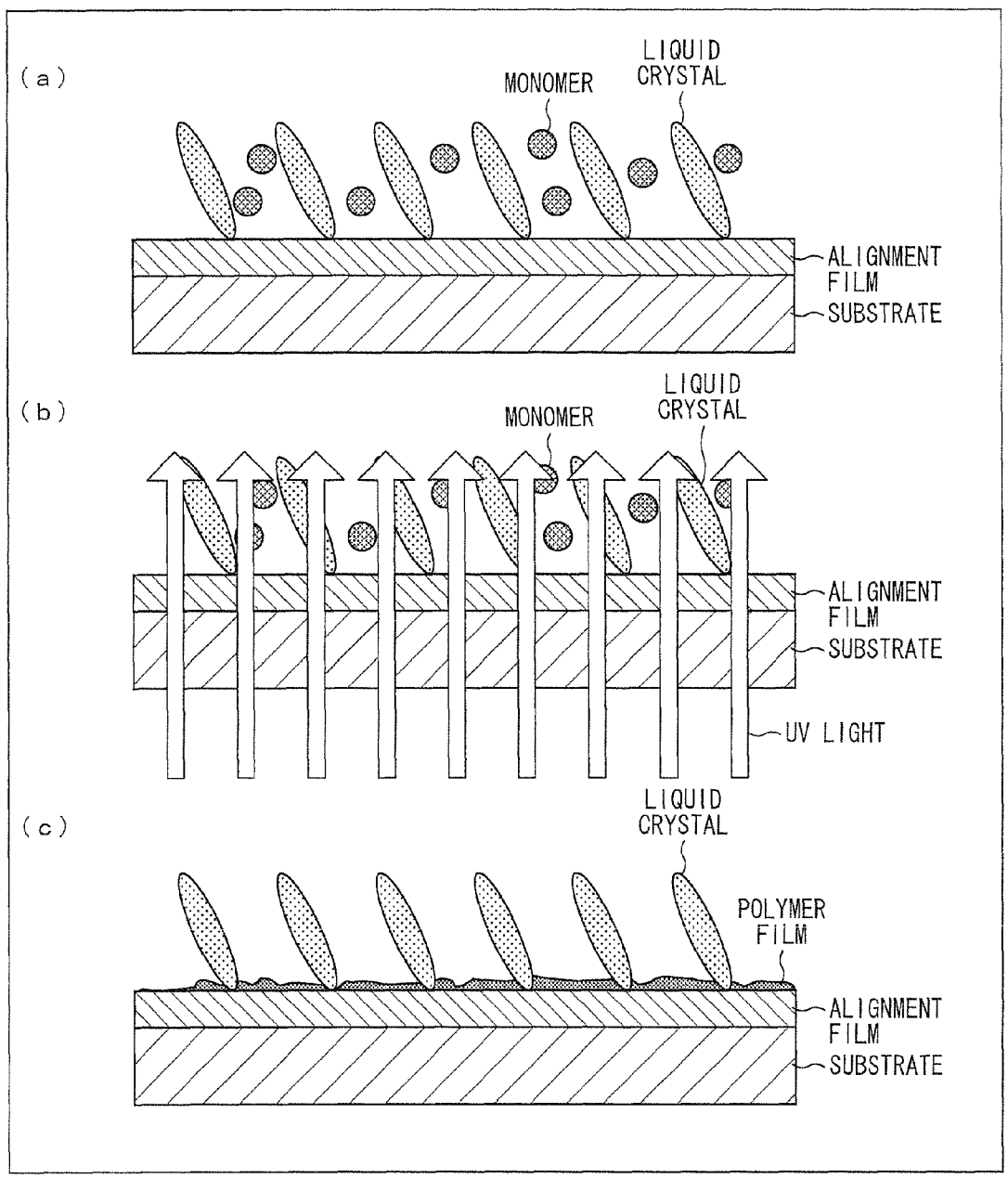
FIG. 2 is a diagram schematically illustrating a method for producing a liquid crystal display panel in accordance with Example 1 of the present invention.

Prepared were alignment films that each contained either (i) a polyamic acid (reagent) having a fluorine atom in a side chain or (ii) a polyimide (reagent) having a fluorine atom in a side chain and having an imidization ratio within the range of 0 to 100%. The alignment films were pre-baked at 80° C. for 5 minutes, and then post-baked at 200° C. for 60 minutes. Next, substrates on which the respective alignment films were formed were each subjected to polarized UV radiation in an oblique direction of 45° for an alignment process. After that, a sealing agent was applied to one of the substrates, whereas beads were sprinkled over the counter substrate. The two substrates were then combined to each other, and liquid crystal having a negative dielectric anisotropy was injected therebetween. As illustrated in (a) of FIG. 2, the liquid crystal contained the bifunctional monomer represented by General Formula (9). After the liquid crystal was injected, the substrates were heated at 130° C. and then quenched. Next, as illustrated in (b) of FIG. 2, UV radiation was carried out for polymerization. This formed, as illustrated in (c) of FIG. 2, polymer films for alignment assistance.

The above reaction (mechanism) for forming the polymer films is described below in detail.

The fluorine atom is high in electrophilicity, and thus the fluorine atom and the biphenyl in General Formula (9) attract each other. When the fluorine atom and the biphenyl attracting each other are subjected to UV radiation, this UV radiation breaks a π bond of the vinyl group in General Formula (9), so that a radical is generated. This radical promotes a dissociation reaction of a double bond in another monomer represented by General Formula (9), so that the polymer represented by General Formula (1) is generated. Further, since the fluorine atom and the biphenyl in the monomer represented by General Formula (9) attract each other, the monomer represented by General Formula (9) has a concentration that is high in the vicinity of a surface of the alignment films. This facilitates a reaction for forming polymer films. Since fluorine atoms are uniformly present over the alignment films, polymer films generated through the above reaction are also uniform films.

Chem. 7

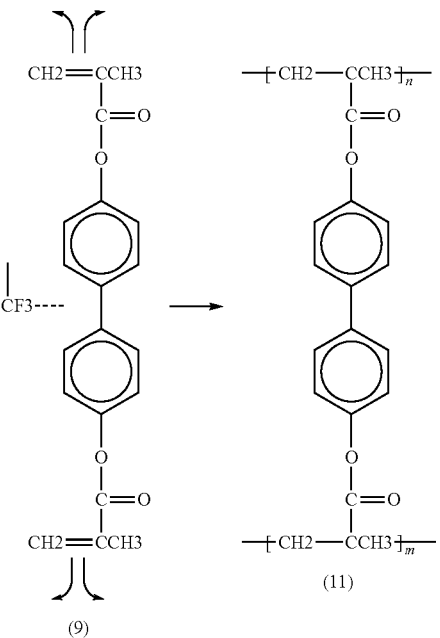

Example 2

Figure 3:
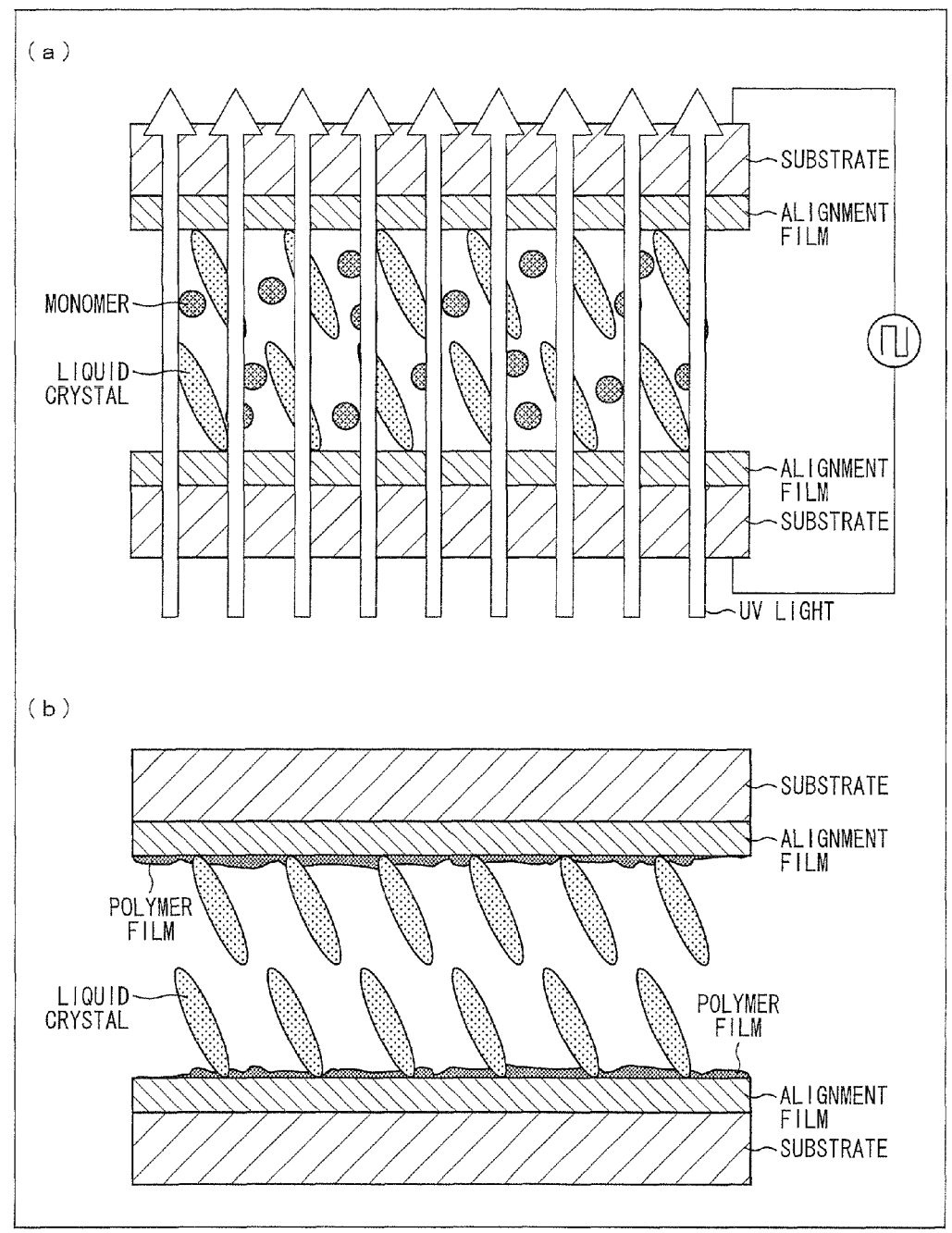
FIG. 3 is a diagram schematically illustrating a method for producing a liquid crystal display panel in accordance with Example 2 of the present invention.

Prepared were alignment films that each contained either (i) a polyamic acid having a fluorine atom in a side chain or (ii) a polyimide having a fluorine atom in a side chain and having an imidization ratio within the range of 0 to 100%. The alignment films were pre-baked at 80° C. for 5 minutes, and then post-baked at 200° C. for 60 minutes. After that, a sealing agent was applied to one of the substrates, whereas beads were sprinkled over the counter substrate. The two substrates were then combined to each other, and liquid crystal having a negative dielectric anisotropy was injected therebetween. As illustrated in (a) of FIG. 3, the liquid crystal contained the bifunctional monomer represented by General Formula (10). After the liquid crystal was injected, the substrates were heated at 130° C. and then quenched. Next, UV radiation was carried out while a voltage of 5 V or larger was applied. This formed, as illustrated in (b) of FIG. 3, polymer films for an alignment process to assist alignment.

The above reaction for forming the polymer films is described below in detail.

The fluorine atom is high in electrophilicity, and thus the fluorine atom and the naphthalene in General Formula (10)

attract each other. When the fluorine atom and the naphthalene attracting each other are subjected to UV radiation, this UV radiation breaks a π bond of the vinyl group in General Formula (10), so that a radical is generated. This radical promotes a dissociation reaction of a double bond in another monomer represented by General Formula (10), so that the polymer represented by General Formula (12) is generated. Further, since the fluorine atom and the naphthalene in the monomer represented by General Formula (10) attract each other, the monomer represented by General Formula (10) has a concentration that is high in the vicinity of the surface of the alignment films. This facilitates a reaction for forming polymer films. Since fluorine atoms are uniformly present over the alignment films, polymer films generated through the above reaction are also uniform films.

Chem. 8

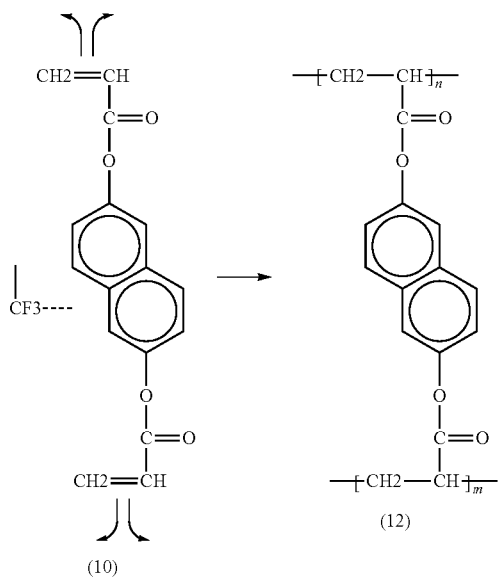

(10)

(12)

Example 3

Figure 4:
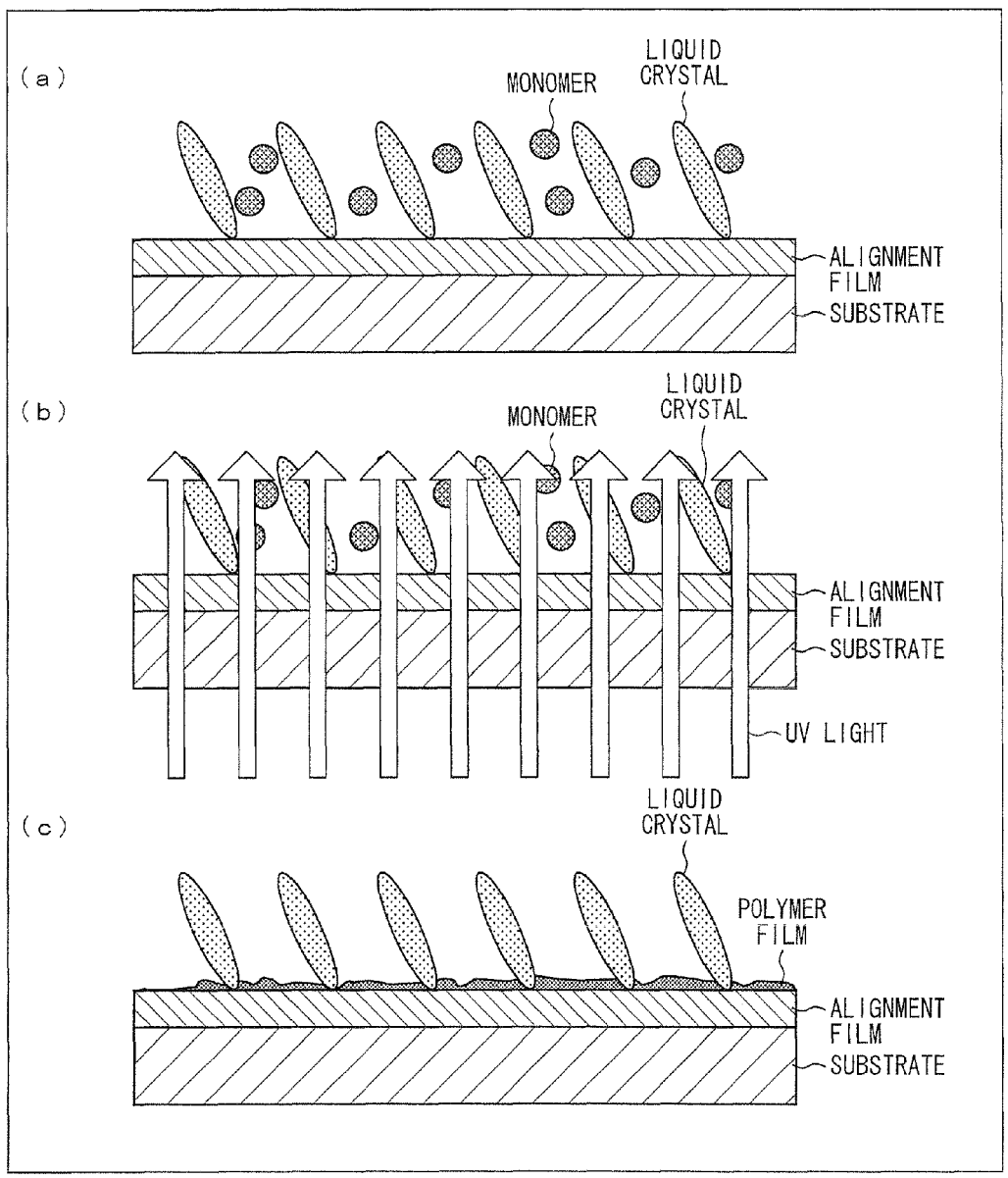
FIG. 4 is a diagram schematically illustrating a method for producing a liquid crystal display panel in accordance with Example 3 of the present invention.

Prepared were alignment films that each contained either (i) a polyamic acid having a photoreactive cinnamate group and fluorine as a side chain or (ii) a polyimide having fluorine and a photoreactive cinnamate group with an imidization ratio within the range of 0 to 100%. The alignment films were pre-baked at 80° C. for 5 minutes, and then post-baked at 200° C. for 60 minutes. Next, substrates on which the respective alignment films were formed were each subjected to polarized UV radiation in an oblique direction of 45° for an alignment process. After that, a sealing agent was applied to one of the substrates, whereas beads were sprinkled over the counter substrate. The two substrates were then combined to each other, and liquid crystal having a negative dielectric anisotropy was injected therebetween. As illustrated in (a) of FIG. 4, the liquid crystal contained the bifunctional monomer represented by General Formula (9). After the liquid crystal was injected, the substrates were heated at 130° C. and then quenched. Next, as illustrated in (b) of FIG. 4, UV radiation was carried out for polymerization. This formed, as illustrated in (c) of FIG. 4, polymer films for alignment assistance.

The above reaction for forming the polymer films is described below in detail.

The $CF_3$ group in General Formula (13) has high electron-withdrawing property. The $CF_3$ group and the biphenyl in General Formula (9) thus attract each other. When the $CF_3$ group and the biphenyl attracting each other are subjected to the UV radiation, this UV radiation breaks a π bond of the cinnamate group that is contained in the alignment film and that includes the functional group represented by General Formula (13), so that a radical is generated. The radical serves as an initiator to (i) promote a dissociation reaction of a double bond in the monomer represented by General Formula (9) and consequently (ii) generate the compound represented by General Formula (14). Further, the compound represented by General Formula (14) contains a vinyl group that has a double bond, which is dissociated by the UV radiation to generate a radical. This radical then reacts with either the vinyl group in the monomer represented by General Formula (9) or the vinyl group in the compound represented by General Formula (14) to generate polymer films. Since the functional group represented by General Formula (13) is uniformly present on the alignment films, polymer films generated through the above reaction are also uniform films.

Chem. 9

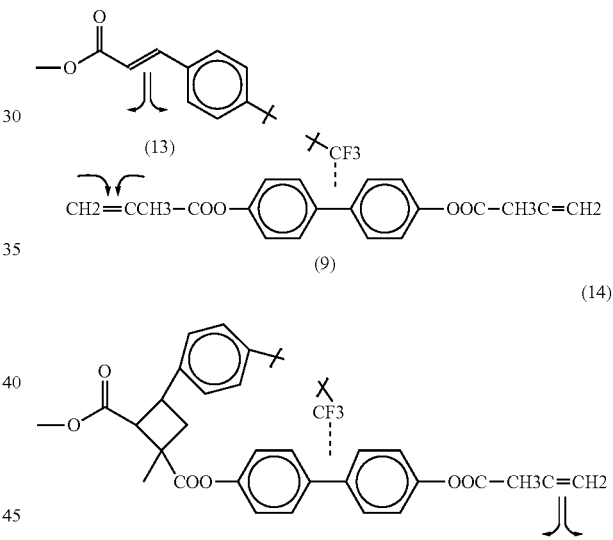

(13)

(9)

(14)

Conclusion From Examples

Figure 5:
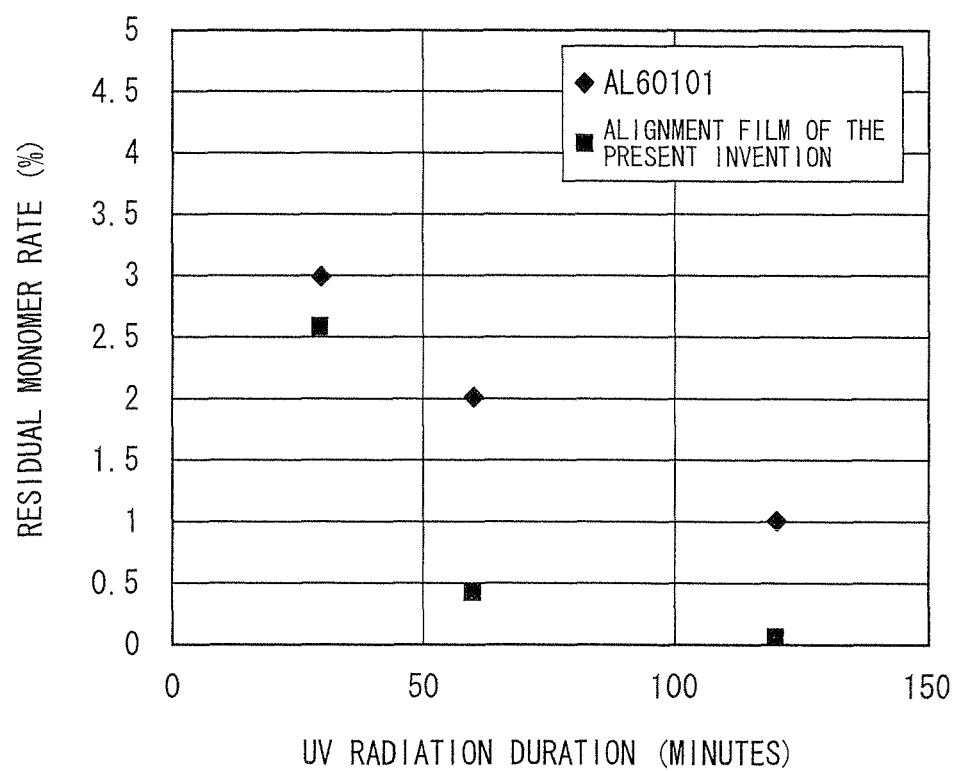
FIG. 5 is a graph illustrating a relation between a UV radiation duration and a residual monomer rate in connection with the method for producing a liquid crystal display panel in accordance with each of Examples 1 through 3 of the present invention.

FIG. 5 is a graph illustrating, with respect to the duration of UV radiation, monomer decrease rates (residual monomer rates) of (i) the alignment films of the present invention that were obtained in Examples 1 through 3 and (ii) a vertical alignment film (product name: AL60101; available from JSR Corporation) for use with ASV (advanced super view) liquid crystal [VA (vertical alignment) liquid crystal]. The graph indicates that a longer UV radiation duration results in a smaller number of long-residual monomers, and thus in a greater progress in generation of a polymer film.

As illustrated in FIG. 5, the alignment films of the present invention clearly allows for a greater progress in generation of polymer films than AL60101.

This is because of the following: There is attraction between (i) the fluorine atom in the side chain of the alignment films of the present invention and (ii) the biphenyl or naphthalene in the monomer. The monomer thus has a concentration that is high in the vicinity of the surface of the alignment films. This facilitates a reaction for forming polymer films.

Further, in the alignment films of the present invention, there is an interaction (weak attractive force) between fluorine atoms in the side chain that are uniformly present and (ii) the biphenyl or naphthalene in the monomer. This allows polymer films to be formed uniformly, and thus prevents Rayleigh scattering. The use of the alignment films of the present invention consequently achieves a contrast of 2000, which is higher than the contrast of 1500 achieved with use of AL60101.

Figure 6:
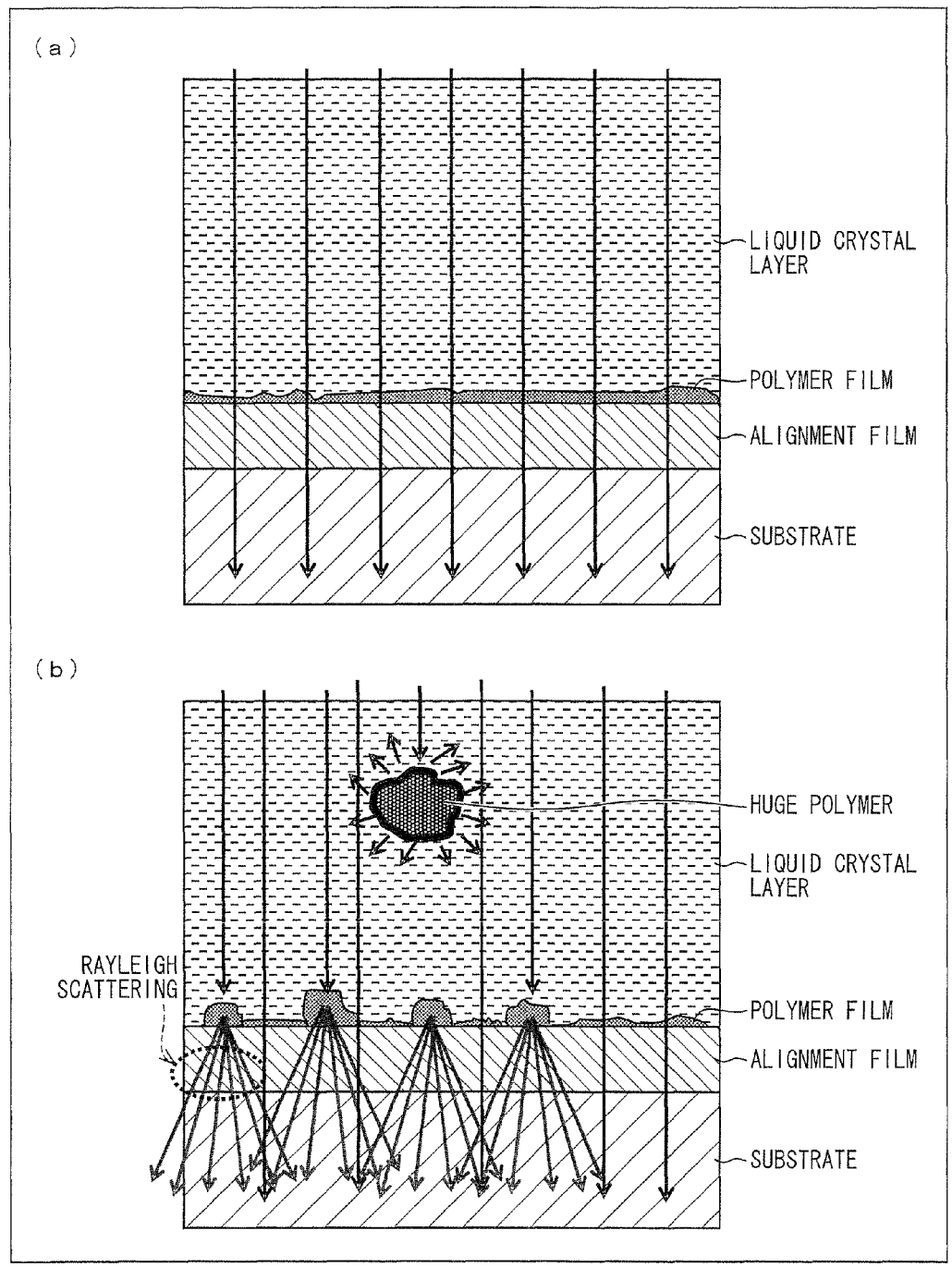
FIG. 6 shows diagrams each schematically illustrating a configuration of a liquid crystal display panel, where (a) is a diagram schematically illustrating a configuration of the liquid crystal display panel in accordance with each of Examples 1 through 3 of the present invention, and (b) is a diagram schematically illustrating a configuration of a conventional liquid crystal display panel.

Conventional liquid crystal display panels, when a polymer film is generated in a liquid crystal bulk (liquid crystal material), (i) cause Rayleigh scattering, with the result of decreased contrast, and (ii) cause generation of a huge polymer, with the result of display deficiency (for example, a bright dot and/or a black dot) (see (b) of FIG. 6).

In contrast, the liquid crystal display panel of each of Examples 1 through 3 of the present invention (i) has high contrast with no Rayleigh scattering and (ii) causes no display deficiency (for example, a bright dot and/or a black dot) with no generation of a huge polymer (see (a) of FIG. 6). Specifically, fluorine atoms uniformly present in the alignment films interact (weak attractive force) with the biphenyl or naphthalene in the monomer to generate uniform polymer films, which (i) prevents Rayleigh scattering caused by a mass of a polymer, (ii) improves contrast, and (iii) neutralizes black. Further, since a uniform polymer film is generated, the present invention prevents generation of a huge polymer that floats in the liquid crystal bulk to cause display deficiency (for example, a bright dot and/or a black dot).

Figure 7:
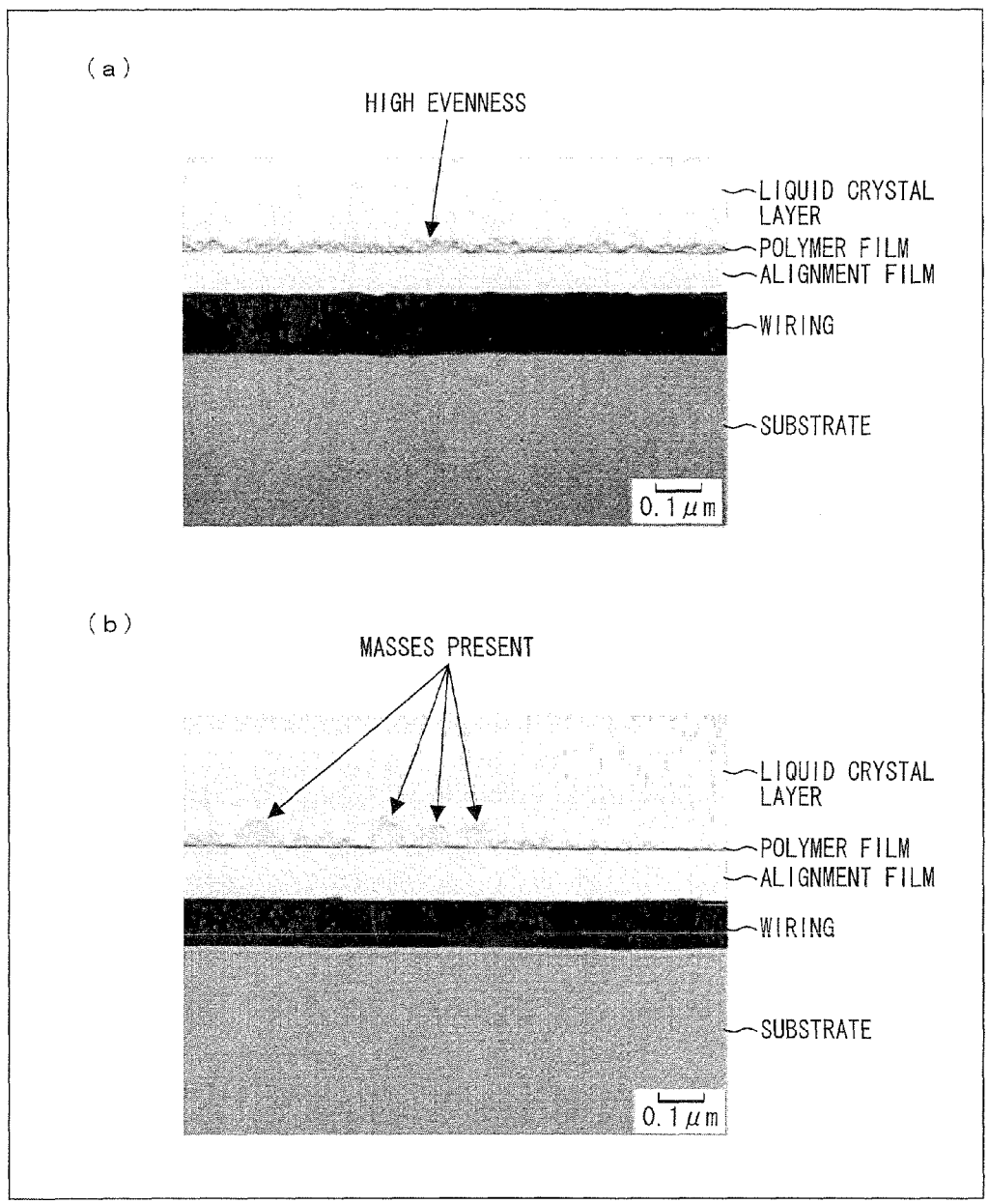
FIG. 7 shows diagrams each illustrating an outline, observed under a TEM, of a liquid crystal display panel, where (a) is an outline, observed under a TEM, of the liquid crystal display panel in accordance with each of Examples 1 through 3 of the present invention, and (b) is an outline, observed under a TEM, of a conventional liquid crystal display panel.

Observations were made of a polymer layer (polymer film) in a conventional liquid crystal display panel (liquid crystal display device) under a transmission electron microscope (TEM; product name: HF-2100; available from HITACHI Co. Ltd.). The observations indicated, as illustrated in (b) of FIG. 7, island-shaped masses instead of a uniform film. These masses were each approximately 100 nm in size, and cause Rayleigh scattering. This in turn causes a contrast decrease and a color shift. In addition, depending on polymerization conditions and the like, polymerization of a monomer occurs not along a surface of the alignment film but in the liquid crystal bulk. This results in a polymer mass floating in the liquid crystal bulk, and thus in a significant decrease in display performance. This is due to the fact that commonly used alignment films have structures that are not suitable for polymerization of the monomer.

In view of the above problems, the liquid crystal display panel of the present invention includes an alignment film containing a fluorine atom. Thus, when a monomer is added to a liquid crystal material as an alignment film material, and the monomer is polymerized by, for example, ultraviolet irradiation while the liquid crystal molecules are aligned in a predetermined direction through, for example, application of an electric field, there is attraction between (i) the fluorine atom in the side chain of the alignment films and (ii) the biphenyl or naphthalene in the monomer, which increases the concentration of the monomer in the vicinity of the surface of the alignment films. Consequently, a polymerization reaction progresses rapidly. Further, since fluorine atoms in the side chain of the alignment films are uniformly dispersed over the alignment films, resulting polymerized films are uniform films. (a) of FIG. 7 illustrates an outline of a polymer layer (polymer film), observed under a TEM, of the liquid crystal display panel of the present invention.

The embodiment and concrete examples of implementation discussed above serve solely to illustrate the technical details of the present invention, which should not be narrowly interpreted within the limits of such an embodiment and concrete examples, but rather may be applied in many variations within the spirit of the present invention, provided that such variations do not exceed the scope of the patent claims set forth below.

INDUSTRIAL APPLICABILITY

The liquid crystal display panel of the present invention is suitably used in a liquid crystal display device. The liquid crystal display panel can be widely used in various electronic devices, for example, (i) office-automation equipment such as a personal computer, (ii) audio-visual equipment such as a television, and (iii) an information terminal such as a mobile telephone.

REFERENCE SIGNS LIST 1 substrate
2 substrate
3 liquid crystal layer (liquid crystal material)
4 alignment film
5 alignment film
6 polymer film
7 polymer film
8 liquid crystal molecule
10 liquid crystal display panel

The invention claimed is:
1. A liquid crystal display panel comprising:
a pair of substrates facing each other; and
a liquid crystal material sandwiched between the pair of substrates,
the pair of substrates being provided with a pair of respective alignment films formed thereon and facing each other,
the pair of alignment films being provided with respective polymer films formed thereon and each made of a monomer in the liquid crystal material,
the pair of alignment films each containing a macromolecular compound having a side chain containing a fluorine atom,
the liquid crystal material containing a polymerizable monomer represented by at least one of General Formulae (1) through (3),
the polymer films each being made of the polymerizable monomer represented by at least one of General Formulae (1) through (3),
the polymer films and the side chain containing the fluorine atom attracting each other through interaction,

Chem. 1

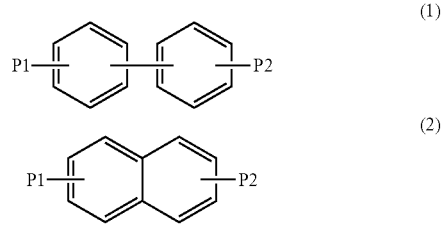

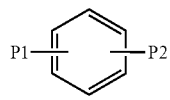 (3)

where P1 and P2 are each independently an acrylate group, a methacrylate group, a vinyl group, or a vinyloxy group.

2. The liquid crystal display panel according to claim 1, wherein:
the macromolecular compound is a polyimide, a polyamide, a polyvinyl, a polysiloxane, a polymaleimide, or a derivative thereof.

3. The liquid crystal display panel according to claim 1, wherein:
the macromolecular compound further includes a functional group represented by at least one of General Formulae (4) through (8), Chem. 2

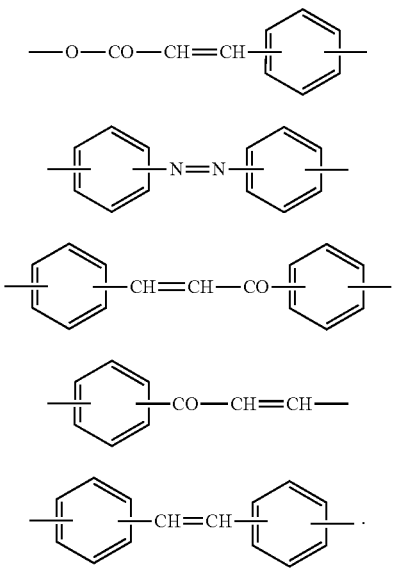

4. The liquid crystal display panel according to claim 1, wherein:
the polymerizable monomer is a compound represented by General Formula (9) or (10), Chem. 3

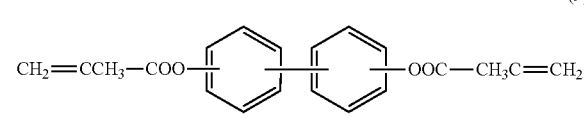

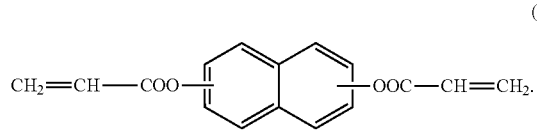

5. A method for producing the liquid crystal display panel according to claim 1,
the method comprising the step of:
irradiating the pair of alignment films and the liquid crystal material with light or heat.

6. The method according to claim 5, wherein:
the method comprises the successive steps of:
carrying out a pretreatment of irradiating the pair of alignment films with light or heat; and
irradiating the pair of alignment films and the liquid crystal material with light or heat.

7. A method for producing the liquid crystal display panel according to claim 1, wherein the display panel comprises a first electrode on a first of the pair of substrates and a second electrode on the other of the pair of substrates, and the method comprising irradiating the pair of alignment films and the liquid crystal material with light or heat while applying a voltage between respective electrodes fixed to the pair of substrates.

8. The method according to claim 5, wherein:
the polymerizable monomer is dissolved in the liquid crystal material.

* * * * *